United States Patent
Pecina et al.

(10) Patent No.: US 8,134,447 B2
(45) Date of Patent: Mar. 13, 2012

(54) ELECTRICAL MULTILAYER COMPONENT AND METHOD FOR PRODUCING AN ELECTRICAL MULTILAYER COMPONENT

(75) Inventors: Axel Pecina, St. Martin (AT); Zeljko Maric, Sisak (HR)

(73) Assignee: EPCOS AG, Munich (DE)

( * ) Notice: Subject to any disclaimer, the term of this patent is extended or adjusted under 35 U.S.C. 154(b) by 53 days.

(21) Appl. No.: 12/732,641

(22) Filed: Mar. 26, 2010

(65) Prior Publication Data

US 2010/0245031 A1    Sep. 30, 2010

Related U.S. Application Data

(63) Continuation of application No. PCT/EP2008/062973, filed on Sep. 26, 2008.

(30) Foreign Application Priority Data

Sep. 28, 2007   (DE) .................. 10 2007 046 607

(51) Int. Cl.
*H01C 1/012* (2006.01)
(52) U.S. Cl. ................ 338/308; 338/309; 361/311
(58) Field of Classification Search .......... 338/307–309; 361/311, 313, 322
See application file for complete search history.

(56) References Cited

U.S. PATENT DOCUMENTS

| | | | | |
|---|---|---|---|---|
| 4,882,650 A * | 11/1989 | Maher et al. | ............... | 361/321.4 |
| 5,034,709 A | 7/1991 | Azumi et al. | | |
| 5,379,016 A * | 1/1995 | Smith et al. | .................... | 338/308 |
| 5,412,357 A | 5/1995 | Nakamura et al. | | |
| 5,495,123 A * | 2/1996 | Canclini | ........................ | 257/500 |
| 5,548,268 A * | 8/1996 | Collins | ........................ | 338/307 |
| 5,870,273 A | 2/1999 | Sogabe et al. | | |
| 6,376,085 B1 | 4/2002 | Oobuchi et al. | | |
| 6,965,167 B2 * | 11/2005 | Liu | ............................... | 257/777 |
| 6,984,543 B2 * | 1/2006 | Mihara et al. | .................... | 438/55 |
| 7,012,501 B2 | 3/2006 | Krumphals et al. | | |
| 7,696,677 B2 | 4/2010 | Ito et al. | | |
| 2003/0150101 A1 | 8/2003 | Park et al. | | |
| 2004/0239476 A1 | 12/2004 | Krumphals et al. | | |

FOREIGN PATENT DOCUMENTS

| | | |
|---|---|---|
| CN | 1180908 A | 5/1998 |
| CN | 1329342 A | 1/2002 |
| CN | 1423517 A | 6/2003 |
| CN | 1875438 A | 12/2006 |
| DE | 101 44 364 A1 | 4/2003 |
| EP | 0 939 061 A1 | 9/1999 |
| GB | 1163434 A | 9/1969 |
| JP | 2001-358034 A | 12/2001 |

* cited by examiner

*Primary Examiner* — Kyung Lee
(74) *Attorney, Agent, or Firm* — Slater & Matsil, L.L.P.

(57) ABSTRACT

An electrical multilayer component has a stack of dielectric layers and electrode layers arranged one above another. Electrode layers of identical electrical polarity are jointly contacted to an external contact arranged at a side face of the stack. A resistor sintered to the stack and containing ceramic resistance material is arranged on an end face of the stack.

21 Claims, 2 Drawing Sheets

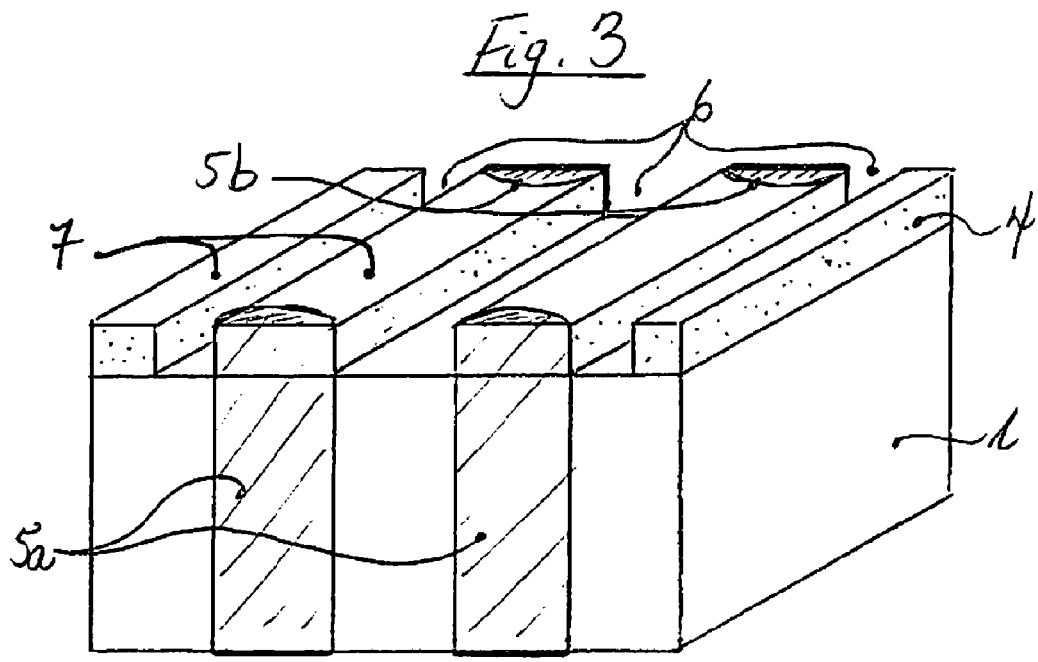
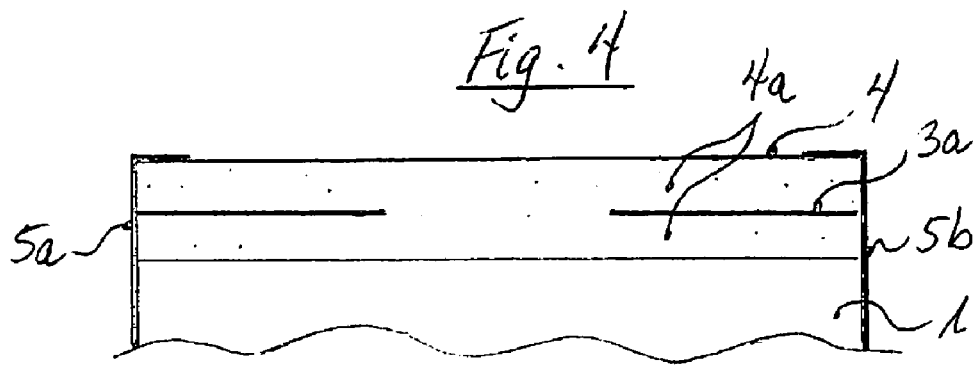
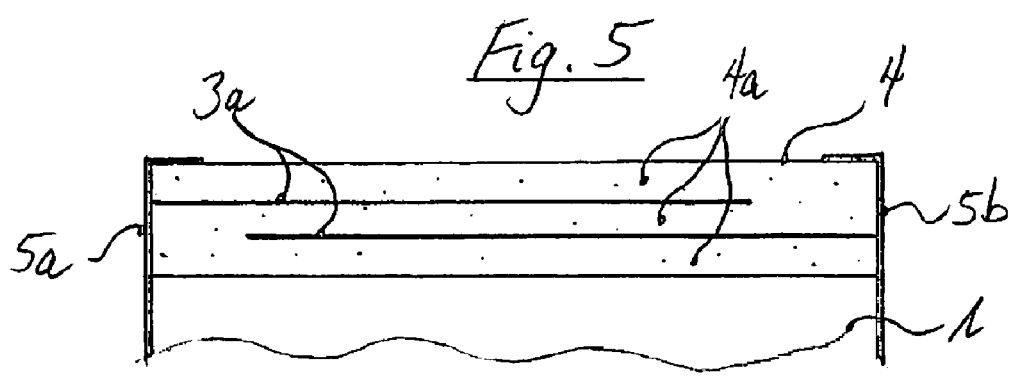

ELECTRICAL MULTILAYER COMPONENT AND METHOD FOR PRODUCING AN ELECTRICAL MULTILAYER COMPONENT

This application is a continuation of co-pending International Application No. PCT/EP2008/062973, filed Sep. 26, 2008, which designated the United States and was not published in English, and which claims priority to German Application No. 10 2007 046 607.4 filed Sep. 28, 2007, both of which applications are incorporated herein by reference.

TECHNICAL FIELD

An electrical multilayer component having a resistor, and a method for producing it are described.

BACKGROUND

German publication DE 101 44 364 A1 discloses an electrical multilayer component having a resistor arranged between two dielectric layers.

SUMMARY

In one aspect, an electrical multilayer component which, in conjunction with a structural size which is to be kept as small as possible, can have as many electrical functions as possible and can be produced easily.

In another aspect, a multilayer component as outlined above can be used as a π filter.

An electrical multilayer component having a stack of dielectric layers and electrode layers arranged one above another is disclosed. A resistor is sintered to an end face of the stack. In order to make contact with the multilayer component, electrode layers of identical electrical polarity can be jointly contacted to an external contact arranged on a side face of the stack.

Thereby, the resistor contains ceramic resistance material which advantageously combines fixedly with the stack during sintering.

The resistance material does not lose its property as a resistor up to a sintering temperature of between 900° C. and 1200° C. In particular, its resistance value changes at most only slightly between room temperature and sintering temperature. However, this does not preclude change in its material microstructure up to the stated temperature. Moreover, its material microstructure could change as early as during a process of pressing the stack, without its desired property as a resistor being impaired.

Advantageously, the resistor can be sintered together with the stack, if appropriate also pressed beforehand, which means that no further production step is necessary for producing a resistor in and/or on a stack after the sintering of the latter. The resistor can therefore be subjected to pressure treatment and/or temperature treatment simultaneously with the stack.

Any desired forms of resistors are possible. In this case, the resistor could be applied, for example by printing, to the end face of the stack in any desired form, for example, therefore with a multiple curved path or with a meandering course.

In accordance with an embodiment of the multilayer component, the resistor is embodied as a resistance layer. This has the advantage that a stack can be formed from dielectric layers, electrode layers and a resistance layer, wherein the stack can be pressed and can be sintered in this form. The resistance layer can have the same dimensioning relative to its area as a dielectric layer of the stack. In particular, the area of the resistance layer can be appropriately coordinated with the size of the end face of the stack, which could be formed by a surface of a dielectric layer of the stack. This means that it substantially completely covers the dielectric layer or the end face of the stack formed from dielectric layers and electrode layers, preferably without having projecting regions. A stack which includes a resistance layer and is produced in this way can be handled or transported with less risk of damage.

A resistor embodied as a layer has the property of being sufficiently stable as a result of the sintering such that no protective or passivation layer is required for the stack. Therefore, the resistance layer also simultaneously functions as a protective layer for the stack. The stack could nevertheless be embodied as necessary with an additional passivation layer, the form of which preferably leaves out the external contacts and could contain a glass, for example.

In accordance with an embodiment of the multilayer component, the resistor can have material-removed regions. The material removal could have been produced by means of laser removal of regions of the resistor and/or by chemical etching through the regions. Material-removed regions of the resistor are preferably produced for the fine tuning of its resistance value.

By way of example, the resistor could have at least one structure trench for the fine tuning of its resistance value. A plurality of structure trenches can be provided, which form a regular pattern on the end face of the stack. The plurality of structure trenches can be arranged parallel alongside one another.

In accordance with an embodiment, the resistor connects external contacts of opposite polarity in the multilayer component to one another. In this case, regions of the resistor which, if appropriate, were not subjected to material removal, or were subjected to material removal only slightly, can connect the external contacts to one another. However, a continuous resistance layer can connect all the external contacts of the multilayer component to one another.

It has been found that a material on the basis of spinel as resistance material can be sintered particularly favorably with the stack of dielectric layers and electrode layers, without the resistance properties of the material being impaired in this case.

Thus, in accordance with an embodiment of the multilayer component, the resistor consists for the most part of a material based on natural or synthesized spinel. By way of example, the resistor could consist for the most part of $ZnMn_2O_4$.

In addition or as an alternative, the resistor could consist for the most part of a compound of the elements lanthanum (La), zirconium (Zr), titanium (Ti) and oxygen (O) or of a compound of the elements bismuth (Bi), tin (Sn) and oxygen.

In accordance with an embodiment of the stack, the dielectric layers of the multilayer component contain a varistor ceramic, for example, zinc oxide (ZnO).

In accordance with another embodiment of the multilayer component, the dielectric layers contain a capacitor ceramic, for example, from the classes X7R, COG, Z5U.

The electrode layers of the stack preferably contain at least one of the following materials or an alloy of the materials palladium (Pd), copper (Cu), nickel (Ni), tin.

In accordance with an embodiment of the electrical multilayer component, the resistor includes a stack of resistance layers and a plurality of resistance layers arranged one above another, respectively.

In accordance with an embodiment, at least one electrode layer is arranged between two resistance layers of the resistor which are adjacent in the stacking direction, the at least one electrode layer being contacted to an external contact. In this case, a plurality of electrode layers can be arranged on a resistance layer of the resistor, the electrode layers each making contact with different external contacts.

In addition or as an alternative, the resistor can have a plurality of electrode layers which are arranged alternately with resistance layers one above another and have overlap areas which overlap in orthogonal projection. Through a suitable choice of the structure and number of electrode layers arranged in the resistor, its desired resistance value can be concomitantly determined.

Alongside their advantageous properties that concomitantly determine the resistance value, the electrode layers of the resistor also have the advantage that they enable better side-face linking of an external contact to the resistor since they contain a material which binds fixedly with the external contact material.

In accordance with an embodiment, the resistor has both material-removed regions and at least one electrode layer. In this case, it is preferred for at least one material-removed region of the resistor to be present alongside the at least one electrode layer, wherein, nevertheless, the electrode layer is preferably surrounded by resistance material of the resistor or covered by it on all sides, apart from the contact with an external contact.

By way of example, a structure trench could run parallel alongside an electrode layer covered by resistance material. In this case, the electrode layer could include a track which changes direction more than once, wherein a structure trench running alongside it could have an identical or complementary course alongside the electrode layer.

Through a suitable choice of the structure and number of electrode layers arranged in the resistor, the arising of a crosstalk resistance in the multilayer component, which should be understood as a parasitic resistance, can be prevented or at least minimized.

The electrical multilayer component can be embodied as an array in such a way that at least one electrode layer stack of the stack has electrode layers of identical polarity, and the at least one electrode layer stack lies laterally opposite at least one stack of identical type including electrode layers of opposite polarity. The electrode layers of the electrode layer stacks lying opposite one another are arranged on a respective common dielectric layer and have ends facing one another.

It is preferred for external contacts of opposite polarity to be arranged on mutually opposite side faces of the multilayer component.

According to one embodiment, the multilayer component includes at least one π filter including capacitors or capacitances connected in parallel via a resistor. The resistor is preferably the resistor sintered to the stack and the capacitances are those which are produced by means of dielectric layers and electrode layers with opposite polarity which are adjacent in the stacking direction.

A method for producing an electrical multilayer component is specified, wherein a stack of dielectric layers and electrode layers arranged one above another is produced. In this case, ceramic green sheets can be involved, the materials of which can contain a capacitor ceramic or a varistor ceramic, for example, depending on the functional aim of the multilayer component. Each dielectric layer stacked with a further dielectric layers can be printed with an electrode material in order to form an electrode layer.

A still "green" stack thus produced is provided on the top side with a resistor, which is later sintered together with the stack. In this case, a film consisting of a resistance material can be involved, which is placed as a resistance layer onto an end face of the stack.

The stack having the resistor arranged on the end side can first be pressed in order that the dielectric layers and the resistor bind together. The stack can subsequently be sintered with the resistor in a furnace provided for this purpose, at a temperature of between 900° C. and 1200° C. As a result, the dielectric layers and the resistor with a dielectric end layer on the end side bind more fixedly to one another in order to produce a monolithic stack including the resistor.

Before or after sintering, material of the resistor, if the latter is present in the form of a layer on the stack, can be partly removed by means of a laser in order to set its resistance value precisely. As an alternative, the partial removal of the resistance material can be effected by means of a chemical etching method.

The removal of the resistance material is preferably embodied in such a way that the resistor has a structure on the basis of which external contacts are connected to one another by means of the resistor. Thus, the resistor can have a form which, by way of example, forms a multiple curved track.

In accordance with an embodiment of the production method, a plurality of resistors are applied as layers to the end face of the stack. One or a plurality of electrode layers can be arranged between two respective resistance layers, or a respective resistance layer is printed with one or a plurality of electrode layers which can be contacted to an external contact.

The production of electrode layers contacted to external contacts on and/or between resistance layers can serve for the fine tuning of the value of the resistor including the resistance layers. This can be effected together with the removal of resistance material from at least one resistance layer of the resistor.

BRIEF DESCRIPTION OF THE DRAWINGS

The subject matters described will be explained in greater detail on the basis of the following figures and exemplary embodiments. In this case, in the figures:

FIG. 3 shows a perspective view of the electrical multilayer component presented by FIGS. 1 and 2, wherein the resistance layer on the top side has material-removed regions;

FIG. 4 shows a cross-sectional view of a region of an electrical multilayer component in which a resistor including a plurality of resistance layers is arranged with electrode layers; and FIG. 5 shows a cross-sectional view of a region of an electrical multilayer component in which a resistor including a plurality of resistance layers is arranged with electrode layers on different resistance layers.

Figure 1:
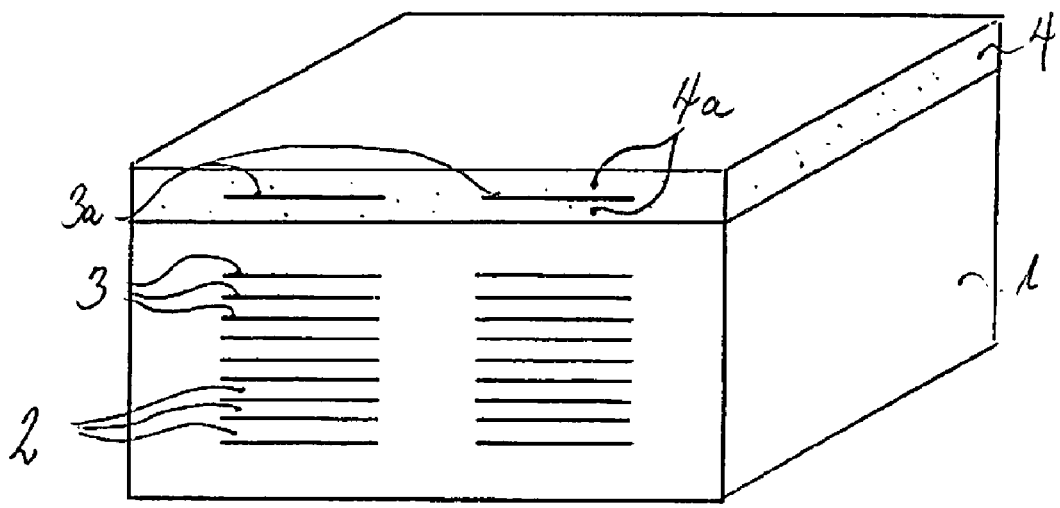
FIG. 1 shows a perspective view of an electrical multilayer component embodied as an array with a resistor top layer.

The following list of reference symbols may be used in conjunction with the drawings:

1 Stack of dielectric layers and electrode layers
2 Dielectric layer
3 Electrode layer
3a Electrode layer integrated in a resistor
4 Resistor
4a Resistance layer
5a First external contact
5b Second external contact, of opposite polarity in comparison with the first external contact
6 Structure trench of the resistor
7 Mesa structure of the resistor

DETAILED DESCRIPTION OF ILLUSTRATIVE EMBODIMENTS

FIG. 1 shows an electrical multilayer component having a stack 1 of dielectric layers 2. On a respective dielectric layer 2 of the stack 1, a plurality of electrode layers 3 are arranged at a distance from one another. In this case, the electrode layers 3 alternate with the dielectric layers 2 in the stacking order, wherein a plurality of electrode layer stacks are formed, the electrodes of which can in each case be contacted to an external contact of identical polarity. In this case, they are led by a respective end as far as the side face, that is to say the side face of the stack which runs parallel to the stacking direction. External contacts are not illustrated in this figure, in order to make the positions of the electrode layer visible.

A resistor or a resistor body 4 including a plurality of resistance layers 4a is arranged on an end face of the stack 1, also referred to hereafter as a top face. A plurality of electrode layers 3a spaced apart from one another are arranged on at least one resistance layer 4a, in this case on the resistance layer 4a connected to the top face of the stack 1, which electrode layers can in each case be contacted to an external contact of identical polarity.

The shown stacks of electrode layers 3 each show the ends of electrode layers of identical polarity which are led as far as a side face of the multilayer component. On the opposite side of the multilayer component, two further electrode layer stacks (not visible) are provided, the respective electrode layers of which are likewise led by a respective end as far as the opposite side face (relative to the figure this could be regarded as the rear side face of the multilayer component), wherein the electrode layers are in each case of opposite polarity in comparison with the electrode layers shown in the figure. Consequently, a dielectric layer 2 can be printed with four electrode layers which are in each case arranged at a distance from one another in square fashion. Electrode layers 3 of opposite polarity in different stacks of electrode layers overlap partly in the stacking direction, wherein the dielectric of a dielectric layer is present between these electrode layers. Consequently, in the multilayer component in accordance with FIG. 1, two multilayer capacitances are formed, in each case by means of the overlapping of electrode layers of opposite polarity in different electrode layer stacks.

Those ends of the electrode layers 3 of a stack of electrode layers which are led to a respective side face are arranged with a minimum lateral offset with respect to one another relative to the stacking direction. Consequently, an entire stack of electrode layers 3 of identical polarity can be contacted to an external contact embodied as narrowly as possible. If the electrode layers are rectangular, then they have with such a form, in their laterally non-offset manner of stacking, mutual maximum overlap areas, which promotes the generation of higher capacitances.

The resistor 4 has four electrode layers 3a on its resistance layer 4a areally connected to the top face of the stack 1. The electrode layers 3a are arranged rectangularly at a distance from one another. A respective electrode layer 3a of the resistor body 4 is contacted by one end to an external contact. The electrode layers 3a of the resistor can reduce the resistance value thereof, which serves for the fine tuning thereof.

Preferably, the electrode layers 3a of the resistor 4 are arranged in the same line as the electrode layers 3 of the stack 1, relative to the stacking direction of the multilayer component. Consequently, external contacts can make contact with all of them, without a region of an end of an electrode layer 3 or 3a that is led to a side face of the component remaining without contact.

The resistance layers 4a consist of the spinel $ZnMn_2O_4$, for example.

The electrode layers 3a of the resistor 4 can contain the same materials as the electrode layers 3 of the stack 1.

Through a suitable choice of the structure and number of the electrode layers 3a arranged in the resistor 4, the ratio of active to crosstalk resistance can be set in such a way that an impairment of the filter function of the multilayer component is minimized. The active resistance, particularly in the case of a multilayer component embodied as an array in accordance with FIG. 1, is the desired resistance formed by the resistor body 4 or by the resistance layers 4a. The crosstalk resistance, by contrast, is a parasitic or undesired resistance in the multilayer component, in particular, such a resistance that is generated between the resistance layers 4a of the multilayer component and impairs the filter function of the multilayer component.

Figure 2:
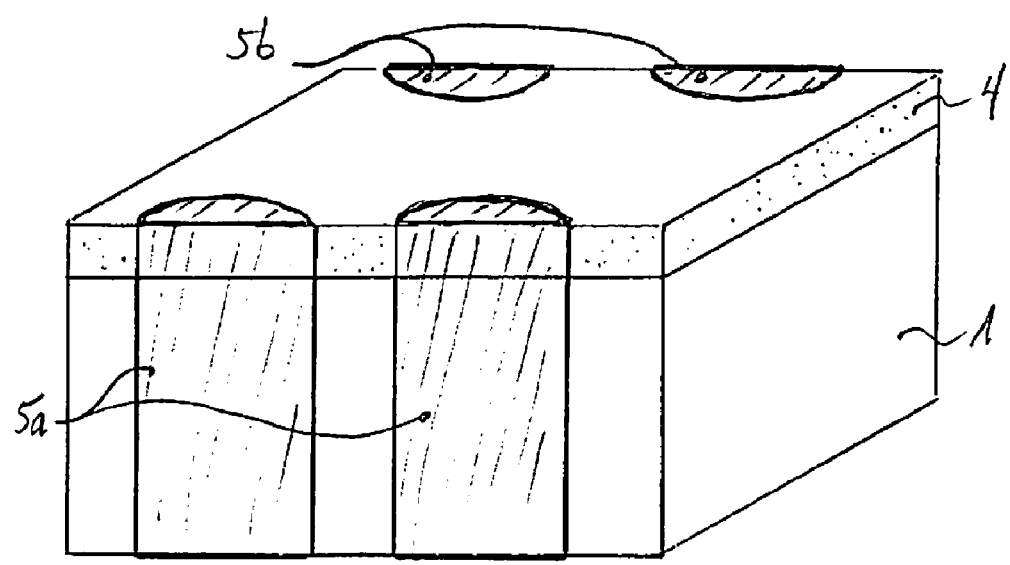
FIG. 2 shows a perspective view of the electrical multilayer component in accordance with FIG. 1 with external contacts.

FIG. 2 shows the multilayer component in accordance with FIG. 1 with illustrated external contacts 5a and 5b, which laterally embrace the multilayer component and have regions at both end faces of the multilayer component, respectively. In particular, they each have a region on the end face of the resistor 4 or the end resistance layer 4a of the resistor, a region which covers or makes contact with the ends of the electrode layers 3a and 3, and also a region on that end face of the stack 1 which is remote from the resistor 4. The external contacts 5a and 5b are connected to one another by the resistor 4 including the electrode layers 3a.

FIG. 3 shows the multilayer component in accordance with FIGS. 1 and 2 with the difference that the resistor 4 has material-removed regions 6, which were produced by means of a material removal method, for example, using a laser. The material-removed regions 6 are formed from structure trenches running parallel to one another, which structure trenches run parallel alongside the longitudinal sides of the electrode layers 3a integrated in the resistor 4. Preferably, the electrode layers 3a of the resistor 4 are nevertheless surrounded by resistance material. The regions of the resistor 4 which still include resistance material and electrode layers 3a after the partial material removal of the resistor 4 are embodied as mesa structures 7 in relation to the structure trenches. The mesa structures 7 of the resistor 4 which include resistance material and electrode layers connect external contacts 5a and 5b lying opposite one another rectilinearly. The mesa structures 7 of the resistor 4 which are connected to external contacts 5a, 5b are preferably in each case partly embraced by the latter at their ends.

FIG. 4 shows the sectional view of a region of an electrical multilayer component which includes a resistor 4 having a plurality of resistance layers 4a. Between two resistance layers 4a which are adjacent in the stacking direction, a plurality of electrode layers 3a lying opposite one another are arranged on the lower resistance layer 4a. Their inwardly directed ends are spaced apart from one another. The sectional view shows two electrode layers, which are connected to an external contact 5a and 5b, respectively, in each case by an end led toward a respective side face. However, further electrode layers 3a can be provided on the same resistance layer 4a, which further electrode layers make contact with external contacts in the same way.

FIG. 5 shows the sectional view of a region of an electrical multilayer component which includes a resistor 4 having a plurality of resistance layers 4a, wherein electrode layers partly overlap in orthogonal projection. In this case, at least one electrode layer 3a connected to an external contact by one end can be applied on each resistance layer, which at least one electrode layer forms an overlap area with a further electrode layer applied on another resistance layer.

What is claimed is:

1. An electrical multilayer component, comprising:
   a stack of dielectric layers and electrode layers arranged one above another, wherein electrode layers of identical electrical polarity are jointly contacted to an external contact arranged at a side face of the stack; and
   a resistor sintered to the stack and containing a ceramic resistance material, the resistor being arranged on an end face of the stack, wherein the resistor comprises a spinel material and in addition or, as an alternative, a compound of lanthanum, zirconium, titanium and oxygen or a compound of bismuth, tin and oxygen.

2. The electrical multilayer component as claimed in claim 1, wherein the resistor is embodied as a resistance layer.

3. The electrical multilayer component as claimed in claim 1, wherein the resistor has material-removed regions for fine tuning of a resistance value.

4. The electrical multilayer component as claimed in claim 3, wherein the material-removed regions comprise a plurality of structure trenches arranged parallel alongside one another.

5. The electrical multilayer component as claimed in claim 2, wherein the resistor comprises a stack of resistance layers.

6. The electrical multilayer component as claimed in claim 5, wherein at least one electrode layer is arranged between resistance layers of the resistor which are adjacent in a stacking direction, the at least one electrode layer being contacted to the external contact.

7. The electrical multilayer component as claimed in claim 6, wherein, in the resistor, a plurality of electrode layers of opposite polarity are arranged alternately with resistance layers one above another and have overlap areas that overlap in orthogonal projection.

8. The electrical multilayer component as claimed in claim 6, wherein, in the resistor, the at least one electrode layer lies opposite an electrode layer of opposite polarity on a common resistance layer.

9. The electrical multilayer component as claimed in claim 6, wherein the resistor has at least one structure trench alongside the at least one electrode layer of the resistor.

10. The electrical multilayer component as claimed in claim 1, wherein:
    the stack comprises a plurality of stacks of electrode layers as an array;
    electrode layers of identical electrical polarity in each electrode layer stack are contacted to an external contact of identical electrical polarity; and
    electrode layers arranged laterally alongside one another in different electrode layer stacks are arranged on common dielectric layers.

11. The electrical multilayer component as claimed in claim 10, wherein the electrical multilayer component comprises a π filter.

12. A method for producing an electrical multilayer component, the method comprising:
    arranging a stack of green dielectric layers one above another, wherein at least one electrode layer is printed thereon;
    applying a resistor containing ceramic resistance material on an end face of the stack, wherein the resistor comprises a spinel material and in addition or, as an alternative, a compound of lanthanum, zirconium, titanium and oxygen or a compound of bismuth, tin and oxygen;
    pressing the stack with the resistor; and
    sintering the stack with the resistor.

13. The method as claimed in claim 12, wherein applying the resistor comprises applying a stack of resistance layers to the end face of the stack.

14. The method as claimed in claim 13, wherein the stack of resistance layers comprises a stack of resistance layers and electrode layers applied to the end face of the stack.

15. The method as claimed in claim 12, further comprising removing resistance material from the resistor as a structure trench.

16. The method as claimed in claim 15, wherein the resistance material is removed by laser removal.

17. The method as claimed in claim 15, wherein the resistance material is removed by chemical etching.

18. The method as claimed in claim 12, wherein producing the electrical multilayer component comprises producing a π filter.

19. The electrical multilayer component as claimed in claim 1, wherein the resistor comprises a spinel material.

20. The electrical multilayer component as claimed in claim 1, wherein the resistor comprises a compound of lanthanum, zirconium, titanium and oxygen.

21. The electrical multilayer component as claimed in claim 1, wherein the resistor comprises a compound of bismuth, tin and oxygen.

* * * * *